United States Patent
Park

(10) Patent No.: US 11,244,380 B2
(45) Date of Patent: Feb. 8, 2022

(54) METHOD OF PROVIDING CREATIVE WORK TRADING SERVICE FOR INCREASING CAPITALIZATION AND ACCESSIBILITY OF CREATIVE WORKS

(71) Applicant: Ok Saeng Park, Yongin-si (KR)

(72) Inventor: Ok Saeng Park, Yongin-si (KR)

( * ) Notice: Subject to any disclaimer, the term of this patent is extended or adjusted under 35 U.S.C. 154(b) by 0 days.

(21) Appl. No.: 15/930,662

(22) Filed: May 13, 2020

(65) Prior Publication Data
US 2021/0049569 A1 Feb. 18, 2021

(30) Foreign Application Priority Data
Aug. 12, 2019 (KR) .................. 10-2019-0098228

(51) Int. Cl.
| | | |
|---|---|---|
| *G06Q 30/00* | (2012.01) | |
| *G06Q 30/06* | (2012.01) | |
| *G06Q 20/12* | (2012.01) | |
| *G06Q 20/32* | (2012.01) | |
| *G06Q 30/02* | (2012.01) | |

(52) U.S. Cl.
CPC ..... *G06Q 30/0641* (2013.01); *G06Q 20/1235* (2013.01); *G06Q 20/3223* (2013.01); *G06Q 30/0272* (2013.01); *G06Q 30/0277* (2013.01); *G06Q 30/0621* (2013.01)

(58) Field of Classification Search
CPC .......... G06Q 20/1235; G06Q 20/3223; G06Q 30/0621; G06Q 30/0641; G06Q 30/0272; G06Q 30/0277
See application file for complete search history.

(56) References Cited

U.S. PATENT DOCUMENTS

| 10,475,085 B2 * | 11/2019 | Kanter ................ G06Q 50/01 |
| 2002/0078178 A1 * | 6/2002 | Senoh ................ G06Q 30/06 |
| | | 709/219 |

(Continued)

FOREIGN PATENT DOCUMENTS

| KR | 10-2010-0124554 A | 11/2010 |
| KR | 10-2017-0059331 A | 5/2017 |

(Continued)

OTHER PUBLICATIONS

"The impact of ad positioning in search engine advertising: a multi-faceted decision problem," by Carsten D. Schultz, Electronic Commerce Research, Springer Science+Business Media, LLC, Jun. 29, 2018 (Year: 2018).*

*Primary Examiner* — Anne M Georgalas
(74) *Attorney, Agent, or Firm* — Sughrue Mion, PLLC

(57) ABSTRACT

Provided is a method of providing a creative work transaction service for increasing capitalization and accessibility of creative works. The method includes receiving registration of creative work data including a profile, a creative work image, creative work description information, and creation process content from at least one creator terminal, registering the creative work image among the registered creative work data in an image archive and uploading the creative work image to a page for sharing, controlling a payment interface to be executed in a user terminal when an event of using the creative work image is received from the user terminal, and transmitting the creative work image to the user terminal when a payment is finished through the payment interface in the user terminal.

6 Claims, 6 Drawing Sheets

(56) References Cited

U.S. PATENT DOCUMENTS

| | | | | |
|---|---|---|---|---|
| 2004/0015427 | A1* | 1/2004 | Camelio | G06Q 30/06 |
| | | | | 705/35 |
| 2005/0278328 | A1* | 12/2005 | Marston | G06F 16/54 |
| 2006/0044599 | A1* | 3/2006 | Lipowitz | G06Q 30/0641 |
| | | | | 358/1.15 |
| 2006/0155645 | A1* | 7/2006 | Sainsbury-Carter | G06Q 40/00 |
| | | | | 705/44 |
| 2006/0224445 | A1* | 10/2006 | Axe | G06Q 30/0283 |
| | | | | 705/14.69 |
| 2007/0179845 | A1* | 8/2007 | Jain | G06Q 30/0239 |
| | | | | 705/14.27 |
| 2008/0140521 | A1* | 6/2008 | Jambunathan | G06F 16/9535 |
| | | | | 705/14.54 |
| 2011/0041189 | A1* | 2/2011 | Shipman | G06Q 10/10 |
| | | | | 726/30 |
| 2011/0080424 | A1* | 4/2011 | Peters | H04N 1/387 |
| | | | | 345/620 |
| 2013/0101231 | A1* | 4/2013 | Cok | G06F 16/51 |
| | | | | 382/224 |
| 2015/0245103 | A1* | 8/2015 | Conte | G06Q 30/0643 |
| | | | | 725/60 |
| 2020/0074172 | A1* | 3/2020 | Kishi | G06T 11/00 |
| 2020/0293995 | A1* | 9/2020 | El Shawwa | G06F 9/5005 |
| 2020/0349628 | A1* | 11/2020 | Sazan | G06T 7/13 |

FOREIGN PATENT DOCUMENTS

| | | |
|---|---|---|
| KR | 10-2017-0141151 A | 12/2017 |
| KR | 10-1983529 B1 | 5/2019 |

\* cited by examiner

[FIG.1]
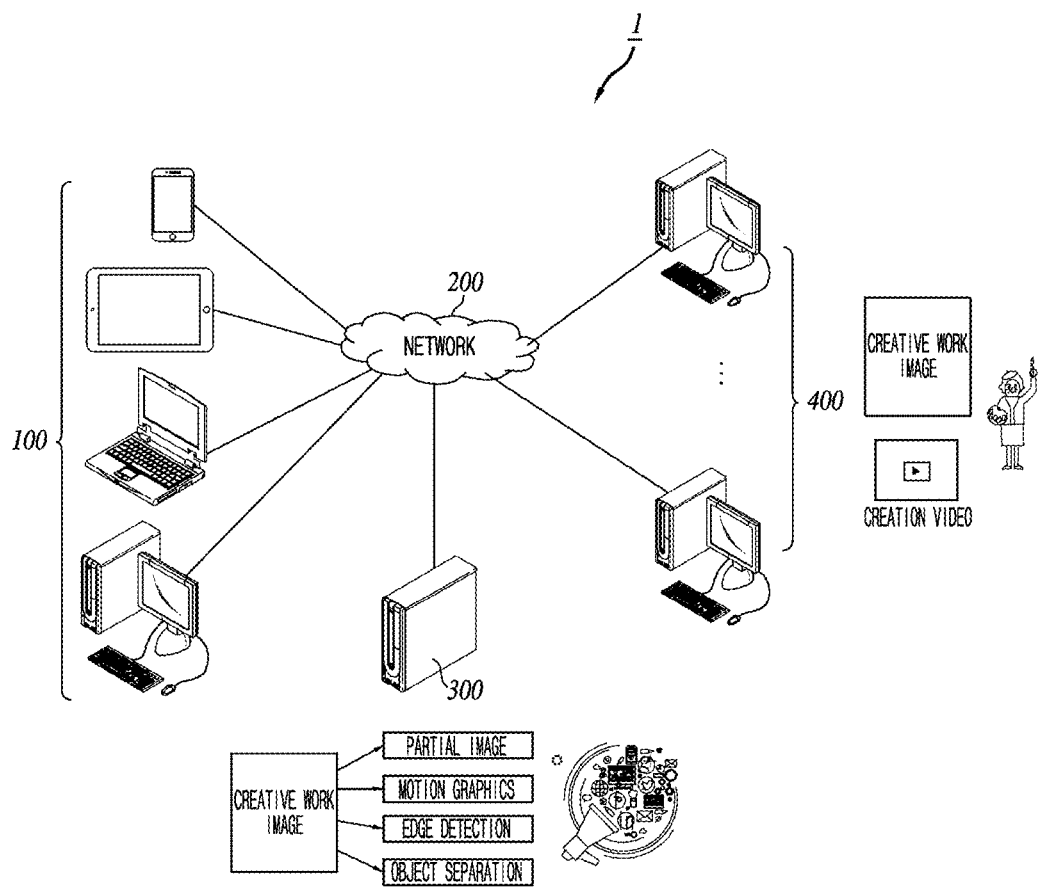

[FIG.2]
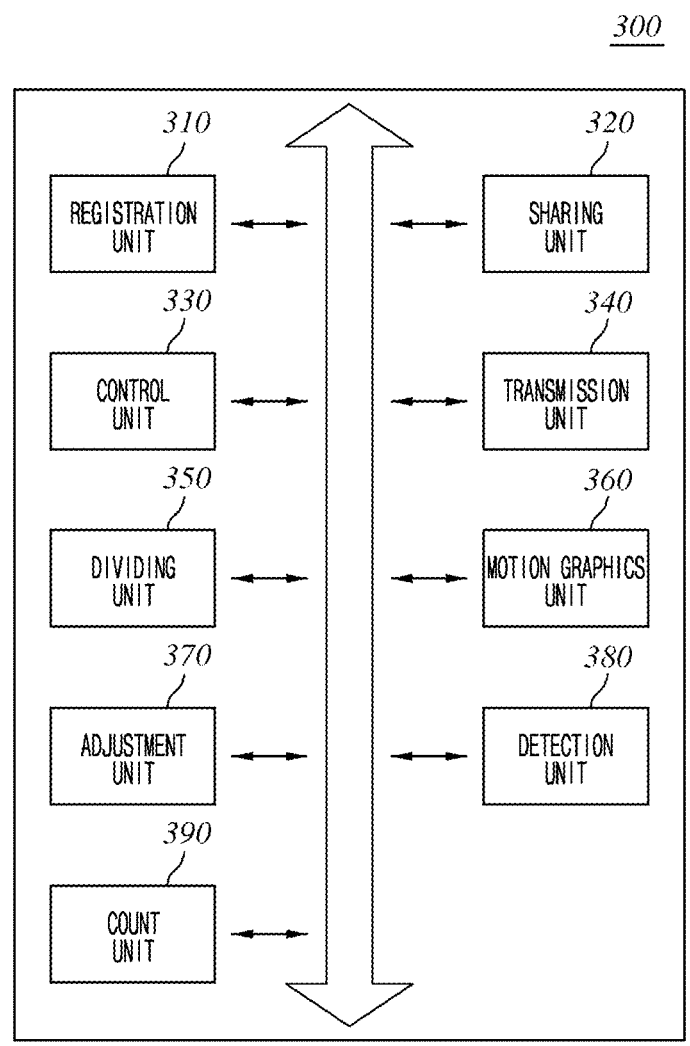

[FIG.3A]
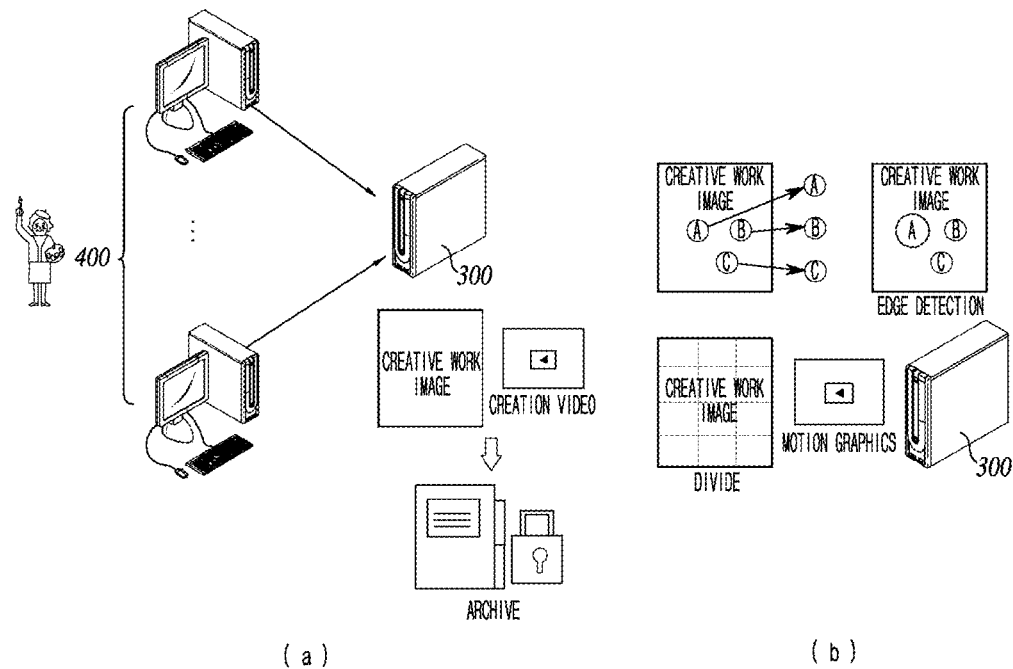
(a)  (b)
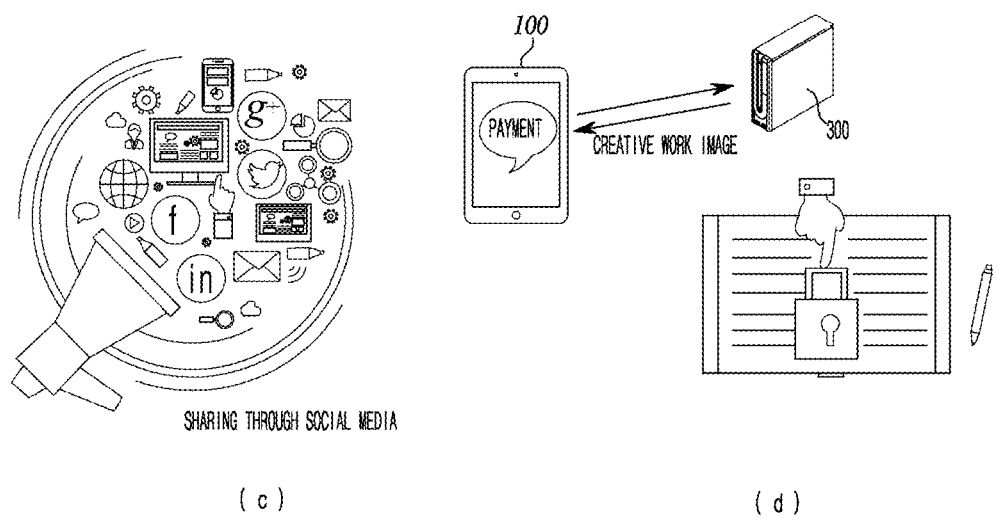
(c)  (d)

[FIG.3B]
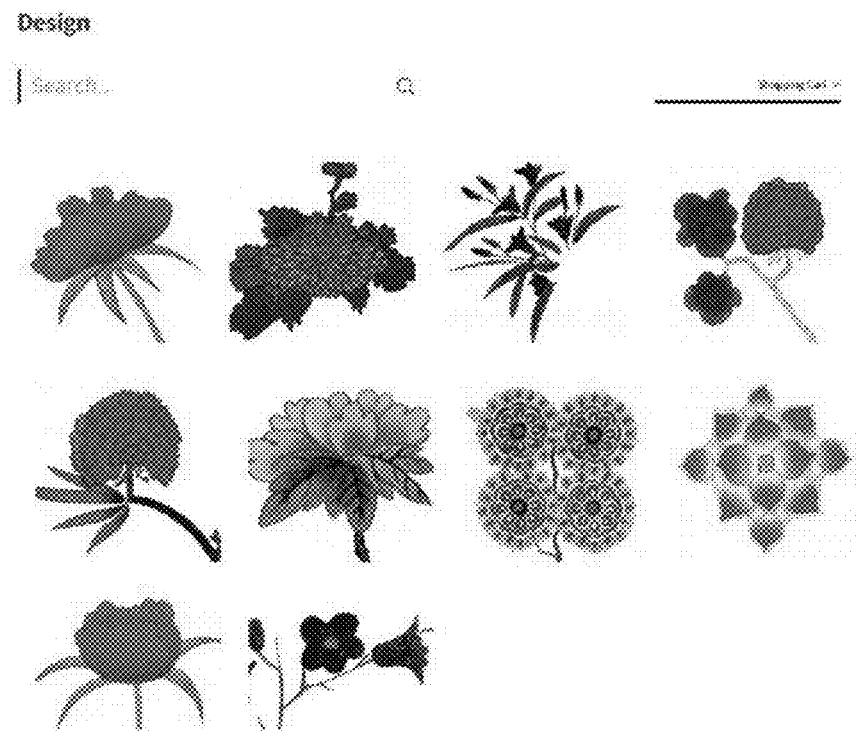
[FIG.3C]
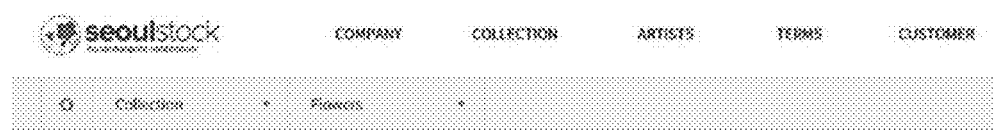
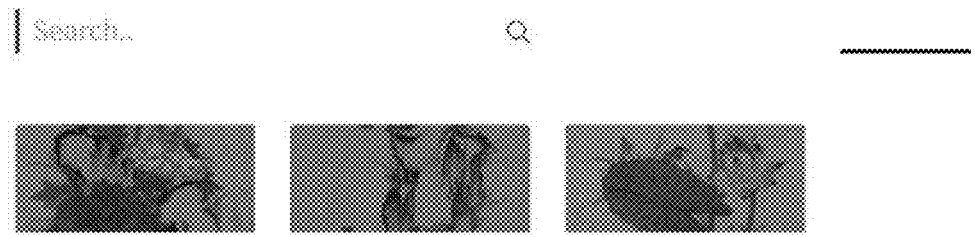

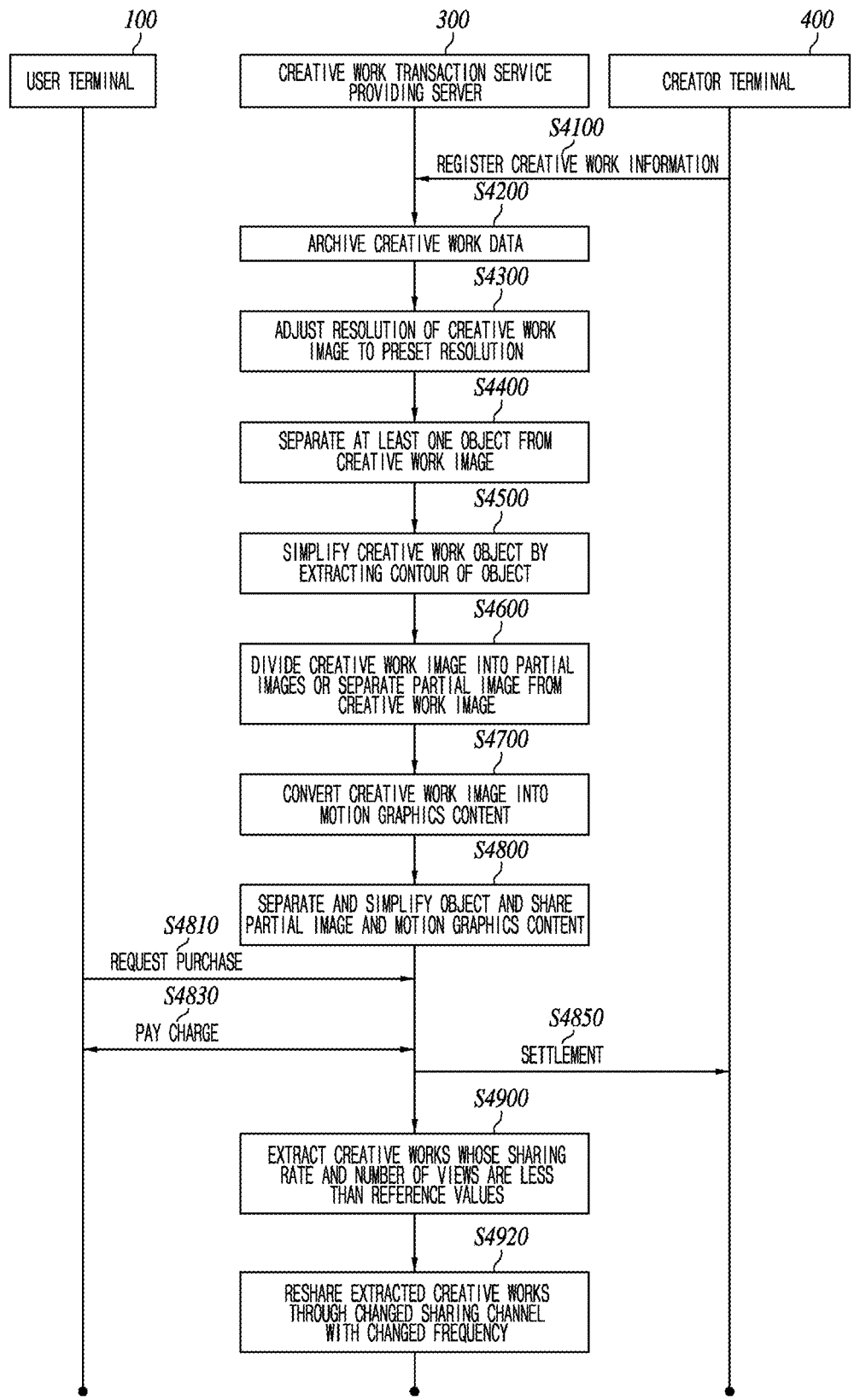

[FIG.5]
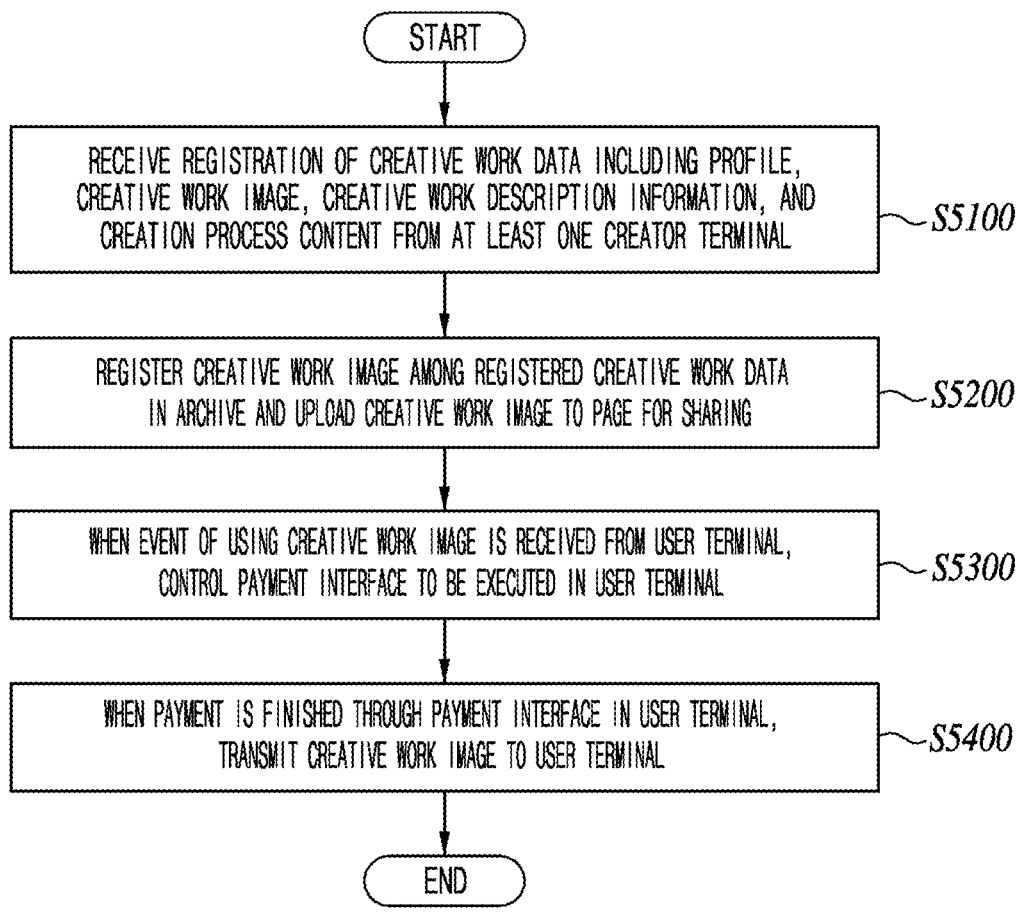

METHOD OF PROVIDING CREATIVE WORK TRADING SERVICE FOR INCREASING CAPITALIZATION AND ACCESSIBILITY OF CREATIVE WORKS

CROSS-REFERENCE TO RELATED APPLICATION

This application claims priority to and the benefit of Korean Patent Application No. 10-2019-0098228, filed on Aug. 12, 2019, the disclosure of which is incorporated herein by reference in its entirety.

BACKGROUND

1. Field of the Invention

The present invention relates to a method of providing a creative work trading service for increasing capitalization and accessibility of creative works, and more particularly, to a platform for capitalizing creative works by selling various forms of creative works and secondary works through division of creative works, object extraction, and generation of motion graphics from creative works.

2. Discussion of Related Art

In the information age, intellectual property law serves to enrich human lives by encouraging growth of information in quality and quantity. Copyright laws aim for quantitative growth of enjoyable information by appropriately adjusting interests of a copyright holder and a user. Korean copyright laws have achieved the highest level in the world beyond the protection level of the Berne Convention which is an international agreement. As Korea established itself as a culture-exporting country rather than culture-importing country, Koreans actively and positively handled copyright policies. However, criteria for creativity are relaxed to protect not only creative works which are recognized to have a considerable level of creativity, such as pure art works, but also works which lack individuality and do not require protecting the moral rights of creators who can limitlessly allow use or adaptations from creative works in return for reasonable economic compensation. For this reason, ironically, true copyright holders are not protected.

A method of receiving registration from a copyright holder and allowing use of his or her creative work according to a smart contract in blockchain was researched and developed. In this regard, Korean Patent No. 10-1983529 (published on May 29, 2019) which is a related art discloses a system including a copyright holder device for registering a creative work having a copyright with a creative work providing server, the creative work providing server for receiving the creative work from the copyright holder device, storing the received creative work, transmitting a creative work requested by a user device to the user device when a valid transaction is performed with cryptocurrency, and distributing proceeds acquired from the valid transaction to a copyright holder with cryptocurrency on the basis of copyright-specific right distribution information, the user device for requesting a payment with cryptocurrency to receive the desired creative work from the creative work providing server, receiving the requested creative work from the creative work providing server, and providing the received creative work, and a blockchain network for verifying a hash value generated on the basis of a transaction of a creative work.

However, even when the above-described configuration is used, the concept of creativity became irrelevant to the level of a scholarly value or artistic value due to the relaxation of criteria for creativity, and there is no way to protect an original copyright holder because works which lack individuality, such as functional works, are protected by copyrights. Also, secondary works which are created through translation, arrangement, modification, adaptation, video production, etc. of an original work are protected as individual works, but such protection is useless because secondary works of pure art works are extremely rarely introduced or sold to the public unless the creator is very popular.

SUMMARY OF THE INVENTION

The present invention is directed to providing a creative work transaction service providing method for increasing capitalization and accessibility of creative works, the method retrieving the right of a copyright holder, which is ironically not protected due to the relaxed concept of creativity, by protecting not only an original creative work of a copyright holder but also secondary creative works and expanding an access right provided to users, making it possible to capitalize buried creative works by enabling a user to make additional profits from partial views or motion graphics of a creative work, exposing more creative works to much of the public by sharing creative image works and creative digital works through online connections including social media, and removing the perception that it is more convenient to use illegal copies than to use legal copies after paying for the copyrights by not only increasing accessibility to registration and use of copyrights through online connections but also providing an intuitive platform. Technical objects of the present invention are not limited to those described above, and other technical objects may also be present.

According to an aspect of the present invention, there is provided a method of providing a creative work transaction service, the method including receiving registration of creative work data including a profile, a creative work image, creative work description information, and creation process content from at least one creator terminal, registering the creative work image among the registered creative work data in an image archive and uploading the creative work image to a page for sharing, controlling a payment interface to be executed in a user terminal when an event of using the creative work image is received from the user terminal, and transmitting the creative work image to the user terminal when a payment is finished through the payment interface in the user terminal.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a diagram illustrating a creative work transaction service providing system for increasing capitalization and accessibility of creative works according to an exemplary embodiment of the present invention;

FIG. 2 is a block diagram illustrating a creative work transaction service providing server included in the system of FIG. 1;

FIGS. 3A-3C show a set of diagrams illustrating an example in which a creative work transaction service for increasing capitalization and accessibility of creative works is implemented according to an exemplary embodiment of the present invention;

FIG. 4 is a sequence diagram illustrating a process in which data is exchanged between components included in the creative work transaction service providing system for increasing capitalization and accessibility of creative works according to an exemplary embodiment of the present invention shown in FIG. 1; and FIG. 5 is a flowchart illustrating a creative work transaction service providing method for increasing capitalization and accessibility of creative works according to an exemplary embodiment of the present invention.

DETAILED DESCRIPTION OF EXEMPLARY EMBODIMENTS

Hereinafter, embodiments of the present invention will be described in detail with reference to the accompanying drawings so that the present invention can be readily implemented by those of ordinary skill in the art. However, the present invention is not limited to the embodiments and can be embodied in various different forms. In the drawings, parts irrelevant to the description are omitted for clarity of description, and like reference numerals denote like elements throughout the specification.

Throughout the specification, when an element is referred to as being "connected" or "coupled" to another element, the element can be "directly connected" or "directly coupled" to the other element or the two elements can be "electrically connected" or "electrically coupled" with another element interposed therebetween. Further, when an element is referred to as "including" another element, other elements are not excluded and can be further included unless the context clearly indicates otherwise. It should be understood that the term "including" does not preclude the presence or addition of one or more other features, integers, steps, operations, components, parts, or combinations thereof.

Terms "about," "substantially," etc. used throughout the specification mean closeness to a numerical value when a tolerance is present in the stated meaning and are used to prevent unauthorized people from exploiting the disclosure in which exact or absolute numerical values are mentioned to facilitate understanding of the present invention. The term "operation of" used in this specification does not mean "operation for."

In this specification, a "unit" includes a unit implemented by hardware, a unit implemented by software, and a unit implemented by both hardware and software. Also, one unit may be implemented using two or more pieces of hardware, and two or more units may be implemented using one piece of hardware.

In this specification, some operations or functions performed by a terminal, an apparatus, or a device may be performed in a server connected to the terminal, the apparatus, or the device. Likewise, some of the operations or functions performed by the server may also be performed in the terminal, the apparatus, or the device connected to the server.

In this specification, some operations or functions described as being mapped or matched to a terminal may be interpreted that the operations or functions are mapped or matched to a unique number of the terminal or identification information of an individual.

Hereinafter, the present invention will be described in detail with reference to the accompanying drawings.

FIG. 1 is a diagram illustrating a creative work transaction service providing system for increasing capitalization and accessibility of creative works according to an exemplary embodiment of the present invention. Referring to FIG. 1, a creative work transaction service providing system 1 for increasing capitalization and accessibility of creative works may include at least one user terminal 100, a creative work transaction service providing server 300, and at least one creator terminal 400. Since the creative work transaction service providing system 1 for increasing capitalization and accessibility of creative works is merely an embodiment of the present invention shown in FIG. 1, the invention is not limited to FIG. 1.

The components of FIG. 1 are generally connected through a network 200. For example, as shown in FIG. 1, the at least one user terminal 100 may be connected to the creative work transaction service providing server 300 through the network 200. The creative work transaction service providing server 300 may be connected to the at least one user terminal 100 and the at least one creator terminal 400 through the network 200. Also, the at least one creator terminal 400 may be connected to the creative work transaction service providing server 300 through the network 200.

The network 200 means a connection structure in which nodes, such as a plurality of terminals and servers, may exchange information with each other. Examples of the network 200 include a radio frequency (RF) network, a third generation partnership project (3GPP) network, a long term evolution (LTE) network, a fifth generation partnership network (5GPP) network, a world interoperability for microwave access (WIMAX) network, the Internet, a local area network (LAN), a wireless LAN, a wide area network (WAN), a personal area network (PAN), a Bluetooth network, a near field communication (NFC) network, a satellite broadcasting network, an analog broadcasting network, a digital multimedia broadcasting (DMB) network, etc. but the network 200 is not limited thereto.

As used herein, the term "at least one" is defined as a term including the singular and the plural. Even when the term "at least one" is not present, it is to be understood that each component may be present singly or as a plurality and may mean the singular or the plural. Also, each component may be provided singly or as a plurality depending on an embodiment.

The at least one user terminal 100 may be a terminal of a user who purchases a creative work using a webpage, an application (app) page, a program, or an application related to a creative work transaction service for increasing capitalization and accessibility of creative works. The creative work may be an art work, a photo work, a video work, a secondary work, or an edited work but is not limited thereto. The edited work means a work exhibiting creativity in selection, arrangement, or configuration of materials, such as creative works, symbols, text, voice, sound, videos, and other data, but is not limited thereto. The at least one user terminal 100 may be a terminal with which the creative work is shared through at least one medium. Also, the at least one user terminal 100 may be a terminal by which a payment is made in the creative work transaction service providing server 300 to purchase the creative work.

The at least one user terminal 100 may be implemented as a computer which may access a remote server or terminal through a network. The computer may be, for example, a navigation device, a notebook computer, a desktop computer, or a laptop computer on which a web browser is installed, or the like. The at least one user terminal 100 may be implemented as a terminal which may access a remote server or terminal through a network. The at least one user terminal 100 may be, for example, a portable mobile wireless communication device which may be any handheld wireless communication device such as a navigation device, a personal communication system (PCS) device, a global system for mobile communications (GSM) device, a personal digital assistant (PDA), an international mobile telecommunication (IMT)-2000 device, a code division multiple access (CDMA)-2000 device, a wideband-CDMA (W-CDMA) device, a wireless broadband Internet (WiBro) terminal, a smart phone, a smart pad, and a tablet personal computer (PC).

The creative work transaction service providing server 300 may be a server which provides a creative work transaction service webpage, an app page, a program, or an application for increasing capitalization and accessibility of creative works. The creative work transaction service providing server 300 may be a server with which creative work data, such as a creative work image, a creation process, a creator profile, a creative work description, and images of all creative works made by the creator, is registered by the at least one creator terminal 400 or may be a server which proceeds with a copyright contract. Also, the creative work transaction service providing server 300 may be a server which edits creative works through division, modification, generation of motion graphics, edge detection, etc. and shares the edited works through at least one medium. Further, the creative work transaction service providing server 300 may be a server which provides a payment interface when a purchase request for a creative work is received from the user terminal 100 and transmits the creative work for which copyright protection processing has been finished to the user terminal 100.

The creative work transaction service providing server 300 may be implemented as a computer which may access a remote server or terminal through a network. The computer may be, for example, a navigation device, a notebook computer, a desktop computer, or a laptop computer on which a web browser is installed, or the like.

The at least one creator terminal 400 may be a terminal of a creator who uses a webpage, an app page, a program, or an application related to a creative work transaction service for increasing capitalization and accessibility of creative works. The at least one creator terminal 400 may be a terminal which registers creative work data, such as a creator profile, a creator picture, a creative work image, a creative work description, and a creative work creation video, with the creative work transaction service providing server 300. Also, the at least one creator terminal 400 may be a terminal which receives a royalty according to a preset contract.

The at least one creator terminal 400 may be implemented as a computer which may access a remote server or terminal through a network. The computer may be, for example, a navigation device, a notebook computer, a desktop computer, or a laptop computer on which a web browser is installed, or the like. The at least one creator terminal 400 may be implemented as a terminal which may access a remote server or terminal through a network. The at least one creator terminal 400 may be, for example, a portable mobile wireless communication device, which may be any handheld wireless communication device such as a navigation device, a PCS device, a GSM device, a PDA, an IMT-2000 device, a CDMA-2000 device, a W-CDMA device, a WiBro terminal, a smart phone, a smart pad, and a tablet PC.

FIG. 2 is a block diagram illustrating a creative work transaction service providing server included in the system of FIG. 1, and FIGS. 3A-3C show a set of diagrams illustrating an example in which a creative work transaction service for increasing capitalization and accessibility of creative works is implemented according to an exemplary embodiment of the present invention.

Referring to FIG. 2, the creative work transaction service providing server 300 may include a registration unit 310, a sharing unit 320, a control unit 330, a transmission unit 340, a dividing unit 350, a motion graphics unit 360, an adjustment unit 370, a detection unit 380, and a count unit 390.

When the creative work transaction service providing server 300 or another server (not shown) interoperating with the creative work transaction service providing server 300 transmits an application, a program, an app page, a webpage, or the like of a creative work transaction service for increasing capitalization and accessibility of creative works, the at least one user terminal 100 and the at least one creator terminal 400 may install or open the application, the program, the app page, the webpage, or the like of a creative work transaction service for increasing capitalization and accessibility of creative works. Also, the service program may be executed in the at least one user terminal 100 and the at least one creator terminal 400 through a script executed in a web browser. The web browser is a program which enables a user to use a world wide web (WWW) service and receives and shows hypertext described in hypertext markup language (HTML). For example, the application means an application in a terminal and may be, for example, an app executed in a mobile terminal (a smart phone).

Referring to FIG. 2, creative work data including a profile, a creative work image, creative work description information, and creation process content may be registered with the registration unit 310 by the at least one creator terminal 400. In this case, the registration unit 310 may register a copyright contract. When creators of an original creative work and a secondary work are different, that is, in the case of joint works, coworking is required, and when a secondary work is created in a digital manner, the impact of the original creative work, which is the primary work, increases. In this case, a problem may occur in distribution. According to the exemplary embodiment of the present invention, various types of secondary works may be generated and distributed through division, edge detection, motion graphics, etc. which will be described below. Therefore, when an original creative work is registered by a creator, it is necessary to reduce complexity in settling a royalty. To this end, when a creative work which is edited multiple times, a joint creative work, or a collaborative creative work is created, a method of automatically calculating a selling price for an $N^{th}$ creative work and a method of automatically separately paying and settling royalties for creators may be registered as the copyright contract.

The sharing unit 320 may register the creative work image among the registered creative work data in an image archive and upload the creative work image to a page for sharing. Archives mean files collected for backup, storage, or the like in a place of a website or a document custody or a record depository in which public documents and private documents of a government, public offices, and other organizations are owned and kept. While a database is a stack of files, an archive is a platform which categorizes and manages information of creative works according to a categorization method, manages associated process data generated by sharing and selling creative works, and includes processing processes such as various data warehousing and data mining of creators and creative works. Here, the page may be a webpage or an app page and does not preclude a program or an application.

The control unit 330 may control a payment interface to be executed in the user terminal 100 when an event of using a creative work image is received from the user terminal 100. In this case, since illegal distribution is simpler and easier than normal distribution, a payment method may be made simple and convenient. A payment interface takes charge of a series of payment and settlement processes, such as self-verification of a customer, transaction authentication, an approval process of a financial company, purchase after payment, and settlement, and may be implemented in a combined form of a simple customer authentication service and an existing payment gateway (PG) (a payment and settlement agent). Alternatively, an authentication model or an electronic wallet model may be used as a wallet interface, which may perform only self-authentication of a customer, transaction authentication, etc. among electronic financial transaction tasks and may function for an affiliated store to transfer a transaction authentication value for proceeding with an approval process to a financial company.

The transmission unit 340 may transmit the creative work image to the user terminal 100 when a payment is finished through the payment interface in the user terminal 100. The transmission unit 340 may process the transmitted creative work image for copyright protection. In this case, the transmission unit 340 may protect the copyright by inserting copyright information and a distribution log into the content of a multimedia file, such as an image or a video, and prevent tampering by strengthening encapsulation. For the inserted distribution log, a least-loss insertion algorithm which allows identification of creative work content thereafter may be used. When a watermark is inserted into a pure art work, illegal copying may be prevented, but aesthetic characteristics are degraded. Therefore, it is important to insert trackable information while causing minimal damage to an image. Minimal damage means causing no image distortion or no problem in showing an image by inserting minimum data into a file and also means making it possible to extract information inserted into a plurality of regions even when a file is subjected to general modification. Selecting an insertion block requires an operation of avoiding data damage in order to prevent a problem in playing content from being caused by the data damage which is caused by arbitrarily inserting distribution information and requires an algorithm for searching for an insertion block in an image and video. As for a database-related part for minimizing insertion data, after the distribution log is divided into standard information and substantial information, only a numerical log may be inserted as the standard information to minimize the size of standard information, and data matched to numbers of the standard information may be stored as the substantial information in a database. When meaningful distribution information is thus reduced to a minimum size and inserted into a target creative work so that general users may not identify the distribution information, the creative work is protected, and the distribution information may be efficiently used for monitoring through a distribution log.

The dividing unit 350 may separate a partial image including at least one object included in the creative work image from the creative work image before the sharing unit 320 registers the creative work image among the registered creative work data with the image archive and uploads the creative work image to the page for sharing. For example, when a Maltese, a Pug, a Jindo dog, a German Shepherd, and a Poodle are present in a creative work image, a person who likes a Jindo dog may want to buy only the Jindo dog image, and a person who likes a Poodle may want to buy only the Poodle image. Likewise, when a mountain, a valley, a flower, and a person are present in a creative work image, a person may want to buy only the flower image or the mountain image. Accordingly, when an original creative work is too expensive to purchase or the whole creative work does not come into favor but a part thereof in which a desired object is present comes into favor, the dividing unit 350 may detect at least one object in a single creative work image, separate the detected object from the background, and make it possible to sell the separated object as shown in FIGS. 3B and 3C.

In this case, an object detection method may be used. Object detection is a vision technology for identifying an object in an image or a video and is a calculation method for a computer to classify an object through deep learning and a machine learning algorithm. Among deep learning techniques, semantic segmentation employing a fully convolutional network (FCN) may be used. An FCN has a structure employing only convolutional layers and is easy to design. However, an FCN consumes a large amount of computing resources for a long time. Therefore, Bayesian deep convolutional encoder-decoder networks may be used to make semantic segmentation rapid and accurate on the basis of a relatively simple FCN structure to which a video compressed into super-pixels is input. The present invention is not limited to the above-described object detection method and separation method.

Bayesian deep convolutional encoder-decoder networks may include an encoder network, a decoder network, and a pixel-specific classification layer, and the encoder layer may include, for example, 13 convolutional layers, 5 pulling layers, and 3 dropout layers. Also, the decoding layer may have a structure corresponding to the encoder to reconfigure a feature map of which encoding is finished in original video size, and the pixel-specific classification layer may include softmax layers. Each convolutional layer of the encoder network may include a filter bank, convolution operation, batch normalization, and an activation function, and the convolution operation may scan a whole input image and extract features by applying various convolution kernels to a partial input of the whole input image. A feature map extracted through the convolution operation may solve the problem of gradient vanishing by increasing an error convergence rate through batch normalization and applying the activation function. The pulling layers may perform sub-sampling between consecutive convolutional layers. In this way, the pulling layers reduce a dimensionality and strengthen the feature map against movement and distortion by reducing a spatial resolution of the feature map extracted through the convolutional layers. To restore the feature map, which becomes very small while passing through the last layer of the encoder network, to the original video, the decoder network may upsample the feature map using a stored pulling index and reconfigure the upsampled feature map into the input image through a convolution operation using a decoder filter bank. Excluding some nodes through dropout, learning is performed to prevent overfitting, and the pixel-specific classification layer may calculate a probability that the feature map input through the softmax layers corresponds to each class and classify a class corresponding to the highest probability as the class of an object. For example, the input image may be divided into six sub-regions, and an object corresponding to each sub-region may be automatically determined. Also, an occupation ratio of each sub-region to the whole image may be provided.

The motion graphics unit 360 may generate motion graphics content by converting the creative work image into two-dimensional (2D) or three-dimensional (3D) motion graphics before the sharing unit 320 registers the creative work image among the registered creative work data with the image archive and uploads the creative work image to the page for sharing. The 2D or 3D motion graphics may be results of a dimensionalization process of providing a motion of at least one object included in the creative work image, a representation process of adding sound and graphics to the time-space domain and synthesizing the sound, graphics, and time-space domain, and a communication process of adding storytelling content, symbols, and metaphorical elements to the creative work image. Here, motion graphics may be graphics which move as a video communication language. The movement is a concept of the original meaning of a graphic to which time and space are added. Motion graphics mean creative and effective videos represented using elements such as time, space, typography, movement of an image, and sound. Motion graphics have positions corresponding to a spatial concept and frames corresponding to a temporal concept. Therefore, motion graphics may be presented with frames or a timeline. As a z-axis is added to an x-axis and a y-axis which represent a position, a space limited in width, height, and depth may be presented as a 3D space in a screen and may also be presented with the three axes and the temporal concept (second). Motion graphics make it possible to recognize movement of an object presented in a 2D screen as if in a 3D space. This is because humans perceive a 3D space more easily than a 2D plane.

In motion graphics, movement on a screen may be represented by movement of an object and movement of a camera. Such movement is synthesized by analyzing movement of an object, which is formed of all graphical elements, and a camera and giving temporality. The meanings of time, space, and hearing sense are given to movement. Also, movement draws eyes and attracts attention and may bring the effect of information delivery. In motion graphics, movement representations may be based on physical mechanisms of all objects. For example, movement representations may be affected by physical attributes subjected to the natural laws, weight, speed, the gravity law, and the inertia law. Movement is affected by several conditions. In a screen, meanings delivered by time, speed, directivity, etc. may vary. Also, movement of a camera may be synthesized with a new image by extracting coordinates (in the x, y, and z axes) of video movement through automatic correction technology. Motion graphics may also be manually generated by a person, and various methods may be used in addition to the above-described method.

The adjustment unit 370 may increase or decrease a resolution of the creative work image to a preset resolution before the sharing unit 320 registers the creative work image among the registered creative work data with the image archive and uploads the creative work image to the page for sharing. In most cases, the resolution of a shared creative work image may be decreased to reduce the amount of data for sharing and prevent the original creative work from being exposed as it is, but an increase in the resolution of a shared creative work image is not precluded. The adjustment unit 370 may adjust the resolution of the creative work image to correspond to the size of a type of medium, a frame, or a layout in which the creative work image will be shared. In this case, a resolution may be adjusted in advance according to characteristics, layouts, etc. of media. However, media may have various characteristics, and a resolution may vary depending on layouts or designs of webpages. Therefore, the frame size of each medium may be automatically measured, and the size of the creative work image may be adjusted in real time according to the measured frame size. To this end, the adjustment unit 370 may access a page in which the creative work image will be shared and detect a sharing space in the accessed page. The size of the space may be the size of a frame or a layout. When the size of the space is detected, the adjustment unit 370 reduces the resolution (size) of the creative work image according to the horizontal and vertical sizes. When at least one object included in the creative work image is reduced to a preset size or less, the creative work image may be divided and output.

When a creation video or creative work is shared, the adjustment unit 370 may further use a method of maintaining a watermark in spite of a change in resolution to prevent scaling, which is a geometric attack, or illegal reprocessing of the video or creative work. In this case, dual domain watermarking which employs a spatial domain or two or more frequency domains among a discrete cosine transform (DCT) domain, a discrete wavelet transform (DWT) domain, and a discrete Fourier transform (DFT) domain may be used to generate, insert, and extract a watermark. Accordingly, even when a shared creative work is generated in another form, such as a video or an image, or a resolution is changed, distortion of a watermark may be prevented. To this end, the adjustment unit 370 may collect only discrete cosine (DC) components through block DCT to generate a DC video and perform DWT on the DC video to hierarchically insert a watermark into each sub-band of a multi-resolution frequency domain. Also, an arbitrary threshold value may be set as a criterion for watermark insertion, and a watermark may be inserted only into a wavelet coefficient exceeding the threshold value in each sub-band.

The adjustment unit 370 makes it possible to protect a copyright by classifying a print size according to resolution of the image. For example, when an image having a resolution (size) of A×B is uploaded to Facebook, printing the image in A×B size allows a digital copy and thus may infringe on the copyright. Therefore, the adjustment unit 370 may classify resolutions of the image as low resolution and high resolution (a larger number of classifications are possible). When the image is printed or uploaded to another page, the adjustment unit 370 may reduce the resolution to be lower than the uploaded size so that the image may not be recognized due to the low resolution. This is referred to as print resolution. The upload resolution and the print resolution are set differently, and when a user tries to illegally use the image, the image is controlled to be output at a resolution lower than that of the shared image. In this way, massive cultural content of 20,000 or more Korean creators can launch into the global market and can also be prevented from being illegally used. Also, since Korean creators can go into the global market, it is possible to create immense national wealth. In addition to Korean creators, creators all over the world can also participate in the movement, and thus it is possible to lay the foundation of a unicorn company which can archive and capitalize global art in Korea.

The detection unit 380 may extract at least one object using an edge detection algorithm for extracting at least one object included in a creative work image along the boundary and store the extracted at least one object in combination with the creative work image before the sharing unit 320 registers the creative work image among the registered creative work data with the image archive and uploads the creative work image to the page for sharing. For example, it is assumed that an object of a Jindo dog is present in the creative work image and the Jindo dog is represented as a detailed sketch in a hyperrealism style. In this case, all detailed parts are not represented, and the object may be simplified, symbolized, or made into an icon through edge detection. When only the edge or outline is extracted, a detailed depiction thereof is simplified. Accordingly, it is possible to sell only the simplified Jindo dog image, and users can select and purchase an image.

There are various edge detection methods. However, according to the embodiment of the present invention, a creative work has various curves, and thus it is necessary to use an edge detection method robust to curves. Accordingly, an active contour detection model may be used. In this case, an active contour may be defined as an energy-minimizing spline and may vary depending on a shape and a position in the image. A snake is considered as many control points or includes many control points and is freely varied in shape by binding force. Since a snake modification is made by minimizing an energy function, a contour is moved from an initial position until the energy is stabilized at a meaningful edge, and external energy is generally set to a gradient value of a video and acts as force which moves the snake. While a human can easily acquire a contour, it is not easy for a system to intuitively acquire a contour. However, with a sufficient computation capability, all edges in the image may be randomly selected, and then requirements may be selected. In this case, each node of the active contour detection model moves in a direction for minimizing energy, and nodes repeatedly move toward an inner object so that the contour of the object is finally extracted. The present invention is not limited to the above-described method, and various methods may be used in addition to the above-described method.

To create a secondary work using an existing image of a creator, a company and an individual creator collaborate with each other. In this case, it takes a long time and great effort to create and commercialize an image, and as described above, distribution of royalties is also complicated. However, when the exemplary embodiment of the present invention is used, it is unnecessary to hire a designer to create a secondary work according to a user's need, and it is possible to solve the problem of a copyright contract and distribution of royalties complicated by collaboration. Limitless images can be provided to companies and designers, and it is possible to expand the range of inexpensive and rapid selection of an image suitable for a purpose and a use. Also, an access right can be expanded so that users can use images of creators at minimum costs, and hidden or buried images can be commercialized and capitalized.

The count unit 390 may determine a view rate or a sharing rate of the creative work image uploaded to the page after the sharing unit 320 registers the creative work image among the registered creative work data with the image archive and uploads the creative work image to the page for sharing. Also, the count unit 390 may compare creative work images registered with the image archive with a shared creative work image to extract creative work images which are not viewed or shared or have a low view rate or sharing rate. Further, the count unit 390 may upload and share the extracted creative work images through at least one medium or channel. The view rate may be any one of the number of views, a view period, and a view frequency or at least one combination thereof, and the sharing rate may be any one of the number of shares, a sharing period, and a sharing frequency or at least one combination thereof.

For example, as for popular Korean pop chart 100, only songs ranked in the charts are continuously and repeatedly played. Users are busy and do not listen to new songs one by one to make a playlist. Users consider songs in the top 100 playlist as good songs and repeatedly play the songs. For this reason, the number of playbacks is increased, and the popularity is affected by the increased number of playbacks so that the songs do not fall out of the top 100 playlist. Such a vicious cycle is repeated and fundamentally eliminates an environment in which new songs can enter the top 100 playlist. Therefore, according to the exemplary embodiment of the present invention, only popular creative works are not continuously shared. Rather, creative works which have a low number of views, a low number of shares, or a low number of purchases are selected and continuously exposed by increasing the number of exposures, changing media, or changing modification formats. Even when the number of exposures of a creative work is increased by chance, popular creative works are continuously shared, and other creative works are eliminated before entering the market. Accordingly, the above-described method may be used to prevent a situation in which only limited types of creative works are shared and the ecosystem of creative works becomes monolithic.

Ecological diversity generally includes three elements, that is, a variety of species, the balance thereof, and the disparity thereof. Searching for self-organized evolution and a reproduction structure resulting from the composition of species and distributional difference in an ecosystem is related to the concept of diversity in ecology. In terms of media diversity, most discussions on the diversity of species relate to bias of content created by dominant market participants. In this case, diversity is frequently used as a concept corresponding to dominance and means a way of measuring influence of concentrated media ownership and market-dominating media. However, diversity does not mean diversity of participants only. Media diversity may be classified as source diversity indicating diversity of programs or channels resulting from media ownership, content diversity related to socio-demographic composition, ideology or thoughts, etc. of people participating in programs in connection with program genre and program content, and exposure diversity related to a process in which content is delivered to a consumer. For example, in the case of an algorithm-based content recommendation system in a platform, source diversity affects the source of content, which will be classified by the algorithm, and the algorithm generates profiles of consumers according to ways in which users consume content. When content is diversified, detailed customization is possible regarding what kind of information content users are interested in. Even in the same content, an ideological direction or detailed preference is selected, and thus all of the three layers are tangled with each other when customized content is finally exposed to a user. Therefore, according to the exemplary embodiment of the present invention, creative works having a small number of exposures are exposed a larger number of times, and also creative works are classified according to the above-described 3-layer classification system so that it may be determined through which medium and to what degree it is necessary to expose a creative work.

An operation process according to the above-described configuration of the creative work transaction service providing server of FIG. 2 will be described in detail below with reference to FIG. 3A. However, the following embodiment is one of various exemplary embodiments of the present invention, and the present invention is not limited thereto.

Referring to FIG. 3A, (a) creative work data including a creative work image and a profile of a creator is registered with the creative work transaction service providing server 300 by the at least one creator terminal 400. In this case, the creative work transaction service providing server 300 may register the creative work data in an archive and build an archive model of image copyrights for new creative works to pursue practical protection and activation of creative image works. Also, the creative work transaction service providing server 300 may provide a platform for an organized distribution system and allow systematic access based on the life cycle, that is, circulation-distribution-settlement, of image copyrights. Images corresponding to an initial sketch stage to a creative work completion stage may be archived in a time-series manner, and creative image works of the present invention are not limited to finished creative works.

(b) The creative work transaction service providing server 300 may separate an object from the creative work image, simplify the creative work image through edge detection, divide the creative work image into partial images, or configure the creative work image to have movement in a time-series domain by applying motion graphics to the creative work image. Then, (c) the creative work transaction service providing server 300 may automatically adjust the creative work image to have a resolution corresponding to the feed size of a social medium or a frame or layout size and share the adjusted creative work image when sharing the creative work image through the social medium or the like or may generate an optimal playback environment by performing real-time transcoding in the case of a video. Subsequently, (d) the creative work transaction service providing server 300 may make it possible to conveniently make a payment in the user terminal 100 and may transmit content, which is subjected to copyright protection processing, to the user terminal 100.

Details, which have not been described regarding such a creative work transaction service providing method for increasing capitalization and accessibility of creative works shown in FIGS. 2 and 3A-3C, are identical to or easily inferable from details described above regarding the creative work transaction service providing method for increasing capitalization and accessibility of creative works shown in FIG. 1, and thus a description thereof is omitted.

FIG. 4 is a sequence diagram illustrating a process in which data is exchanged between components included in the creative work transaction service providing system for increasing capitalization and accessibility of creative works according to the exemplary embodiment of the present invention shown in FIG. 1. An example of a process in which data is exchanged between components will be described below with reference to FIG. 4. However, the present invention is not limited to the example, and it is apparent to those of ordinary skill in the art that the data exchange process illustrated in FIG. 4 may be changed according to the above-described various embodiments.

Referring to FIG. 4, when creative work data including creative work information and a creative work is registered with the creative work transaction service providing server 300 by the at least one creator terminal 400 (S4100), the creative work transaction service providing server 300 archives the creative work data (S4200) and automatically adjusts the resolution of the creative work image according to a frame size or resolution of at least one kind of channel or medium to share the creative work image (S4300). In this case, the creative work transaction service providing server 300 may separate at least one object included in the creative work image (S4400) and share or distribute the separated object. Then, the creative work transaction service providing server 300 may extract the contour of at least one object included in the creative work image to simplify the at least one object and then may share and distribute the simplified object image (S4500). Also, the creative work transaction service providing server 300 may divide the creative work image into partial images and sell and share the partial images (S4600) and may convert the creative work image into motion graphics to do a promotion or an advertising activity or distribute the motion graphics content (S4700 and S4800).

Meanwhile, when a purchase request is received from the user terminal 100 (S4810), the creative work transaction service providing server 300 provides an interface so that a payment may be made with at least one type of payment means. When the payment is finished (S4830), the creative work transaction service providing server 300 makes a real-time settlement with the creator terminal 400 or stores payment information in a log for a periodic settlement (S4850). Also, to prevent biased content distribution, the creative work transaction service providing server 300 may analyze the number of content shares, the number of content exposures, the number of content views, etc., extract content whose corresponding values are less than reference values, convert the extracted content for a larger number of media or more various media or into various formats, and then expose the converted content (S4900 and S4920).

The order of the above-described operations S4100 to S4920 is only an example, and the present invention is not limited thereto. In other words, the order of the above-described operations S4100 to S4920 may be changed, and some of the operations may be simultaneously performed or omitted.

Details, which have not been described regarding such a creative work transaction service providing method for increasing capitalization and accessibility of creative works shown in FIG. 4, are identical to or easily inferable from details described above regarding the creative work transaction service providing method for increasing capitalization and accessibility of creative works shown in FIGS. 1, 2 and 3A-3C, and thus a description thereof is omitted.

FIG. 5 is a flowchart illustrating a creative work transaction service providing method for increasing capitalization and accessibility of creative works according to an exemplary embodiment of the present invention. Referring to FIG. 5, creative work data including a profile, a creative work image, creative work description information, and creation process content is registered with a creative work transaction service providing server by at least one creator terminal (S5100), and the creative work transaction service providing server registers the creative work image among the registered creative work data in an archive and uploads the creative work image for sharing (S5200).

When an event of using the creative work image is received from a user terminal, the creative work transaction service providing server controls a payment interface to be executed in the user terminal (S5300). When a payment is finished through the payment interface in the user terminal, the creative work transaction service providing server transmits the creative work image to the user terminal (S5400).

Details, which have not been described regarding such a creative work transaction service providing method for increasing capitalization and accessibility of creative works shown in FIG. 5, are identical to or easily inferable from details described above regarding the creative work transaction service providing method for increasing capitalization and accessibility of creative works shown in FIGS. 1, 2, 3A-3C and 4, and thus a description thereof is omitted.

The creative work transaction service providing method for increasing capitalization and accessibility of creative works according to the exemplary embodiment described with reference to FIG. 5 may be implemented in the form of a recording medium including instructions executable by a computer, such as an application or program module executed by a computer. Computer-readable media may be any available media that can be accessed by a computer and may include volatile and non-volatile media and removable and non-removable media. In addition, the computer-readable media may include any computer storage medium. Computer storage media includes volatile and non-volatile media and removable and non-removable media implemented by any method or technology for storing information, such as computer-readable instructions, data structures, program modules, or other data.

The above-described creative work transaction service providing method for increasing capitalization and accessibility of creative works according to the exemplary embodiment of the present invention may be implemented by an application installed in a terminal by default (which may include a program included in a platform, an operating system, or the like basically installed in the terminal) or may be implemented by an application (i.e., a program) directly installed in a master terminal by a user through an application store server and an application providing server such as a web server associated with the application and the service. In this regard, the creative work transaction service providing method for increasing capitalization and accessibility of creative works according to the exemplary embodiment of the present invention may be implemented by an application (i.e., a program) basically installed in a terminal or directly installed by a user and may be recorded on a recording medium that can be read by a computer such as a terminal.

According to any one of the above-described embodiments of the present invention, it is possible to retrieve the right of a copyright holder, which is ironically not protected due to the relaxed concept of creativity, by protecting not only an original creative work of a copyright holder but also secondary works and expanding an access right provided to users, make it possible to capitalize buried creative works by enabling a user to make additional profits from partial views or motion graphics of a creative work, expose more creative works to much of the public by sharing creative image works and creative digital works through online connections including social media, remove the perception that it is more convenient to use illegal copies than to use legal copies after paying for the copyrights by not only increasing accessibility to registration and use of copyrights through online connections but also providing an intuitive platform, and finally, contribute to the development of cultural and related industries by protecting the rights of creators and neighboring copyrights and promoting fair use of creative works.

The above description of the present invention is provided by way of example and those of ordinary skill in the art will understand that the present invention can be easily changed or modified into other specific forms without a change or modification of the technical spirit or essential characteristics of the present invention. Therefore, it should be understood that the above-described embodiments are illustrative in all aspects and not limiting. For example, each component described as a single form may be separately implemented and, similarly, components described as being separated may be implemented in a combined form.

It should be understood that the scope of the present invention is defined by the following claims rather than the detailed description and the present invention encompasses all modifications and alternatives derived from the meaning and scope of the claims and equivalents thereof.

What is claimed is:

1. A method of providing a creative work transaction service for increasing capitalization and accessibility of creative works, which is performed in a creative work transaction service providing server, the method comprising the following steps in order:
   receiving registration of creative work data including a profile, a creative work image, creative work description information, and creation process content about how a creative work was made from at least one creator terminal;
   converting the creative work image into two-dimensional (2D) or three-dimensional (3D) motion graphics to generate motion graphics content;
   increasing or decreasing a resolution of the creative work image to a preset resolution, wherein when at least one object included in the creative work image is reduced to the preset resolution or less, extracting the at least one object from the creative work image and outputting the at least one object in the preset resolution or larger is performed;
   registering the creative work image in an image archive and uploading the creative work image to a page to be displayed to a user;
   determining a view rate or a sharing rate of the creative work image uploaded to the page;
   identifying a creative work image registered in the image archive which is not viewed or shared, or has the view rate or sharing rate less than reference values; and
   increasing a number of exposures of the creative work image identified as having less than the reference values by displaying the creative work image on the page,
   when an event of using the displayed creative work image is received from a user terminal, controlling a payment interface to be executed in the user terminal; and
   when a payment is finished through the payment interface in the user terminal, transmitting the creative work image to the user terminal,
   wherein the view rate is any one of a number of views, a view period, and a view frequency or at least one combination thereof, and
   wherein the sharing rate is any one of a number of shares, a sharing period, and a sharing frequency or at least one combination thereof.

2. The method of claim 1, wherein the extracting the at least one object from the creative work image and outputting the at least one object in the preset resolution or larger is done by separating a partial image of the creative work image including the at least one object from the creative work image.

3. The method of claim 1, wherein the extracting the at least one object from the creative work image and outputting the at least one object in the preset resolution or larger is done by extracting the at least one object using an edge detection algorithm for extracting the at least one object included in the creative work image along a boundary of the object; and
   storing the extracted at least one object in combination with the creative work image.

4. The method of claim 1, wherein the creative work image is shared in connection with at least one social medium.

5. The method of claim 1, wherein the transmitting of the creative work image to the user terminal comprises performing copyright protection processing on the creative work image to be transmitted to the user terminal.

6. The method of claim 1, further comprising a step of controlling the creative work image to be output at a resolution lower than an original resolution when a user tries to illegally use the creative work image.

* * * * *